United States Patent Office 3,605,767
Patented Sept. 20, 1971

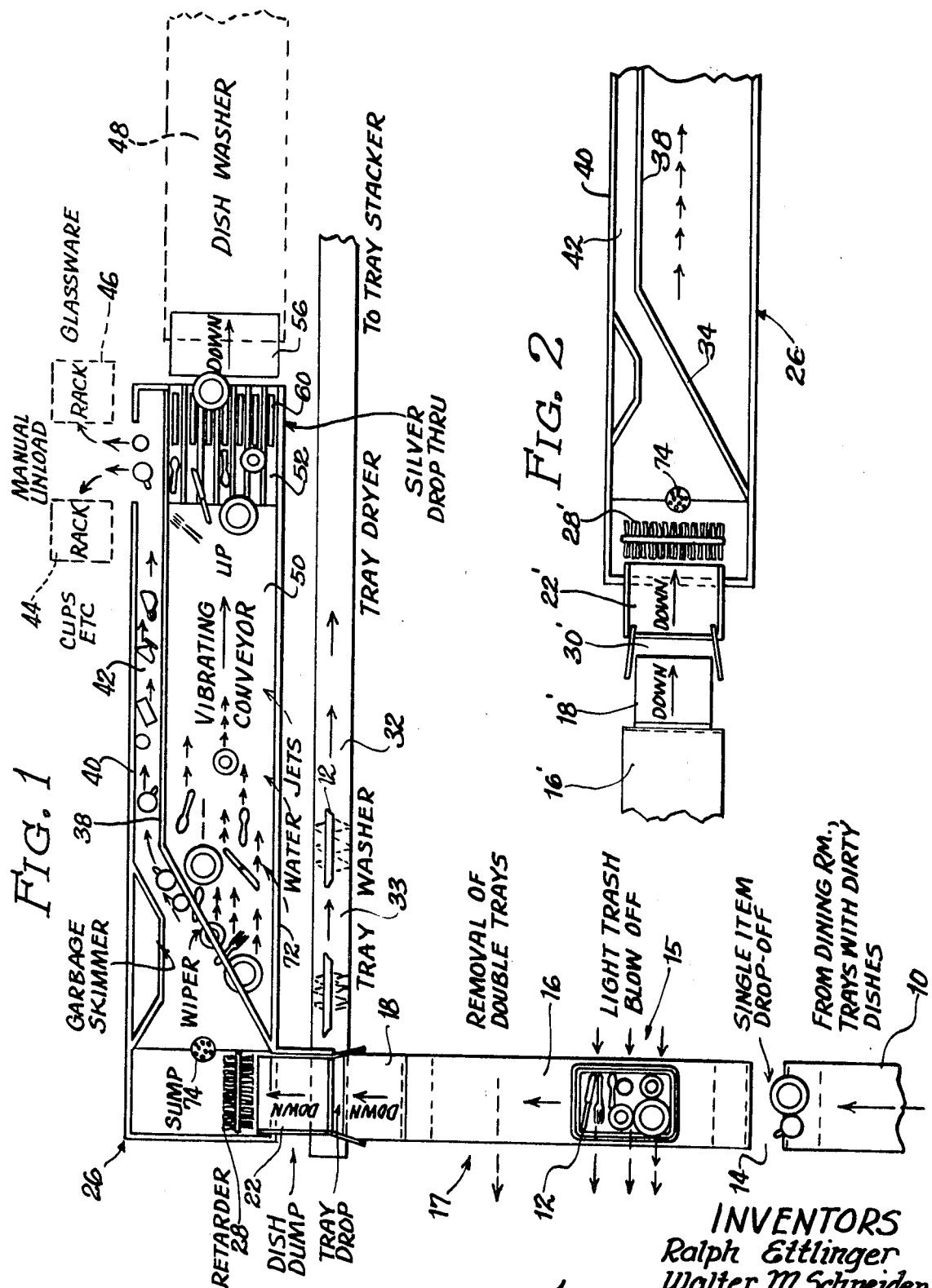

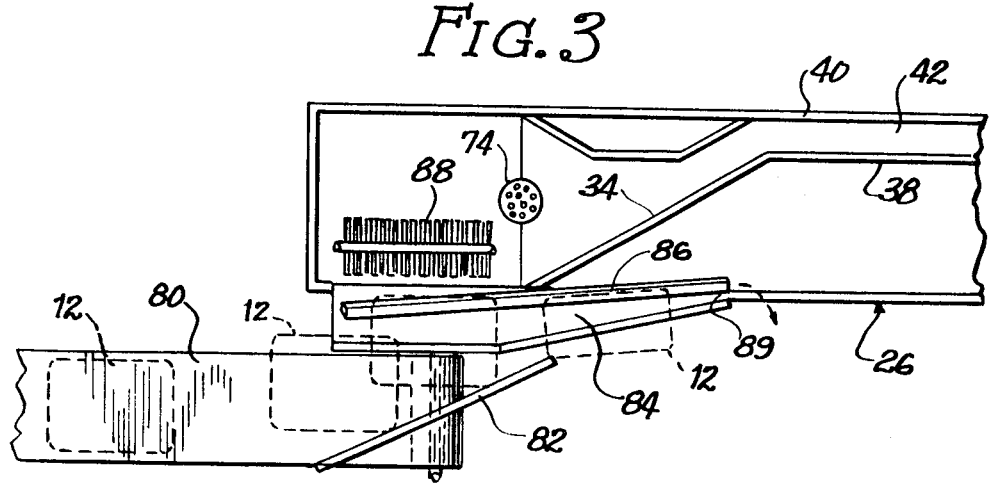
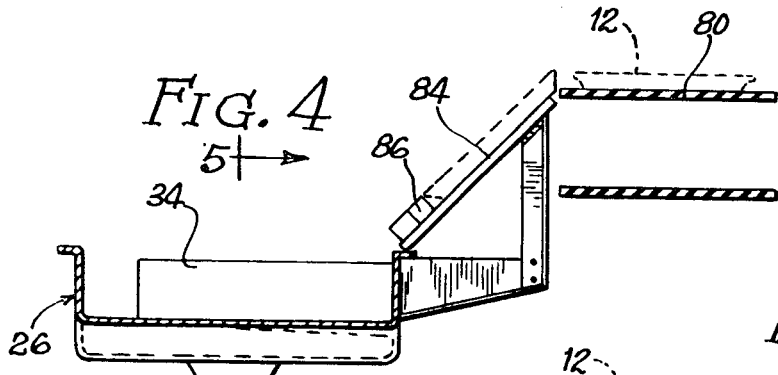
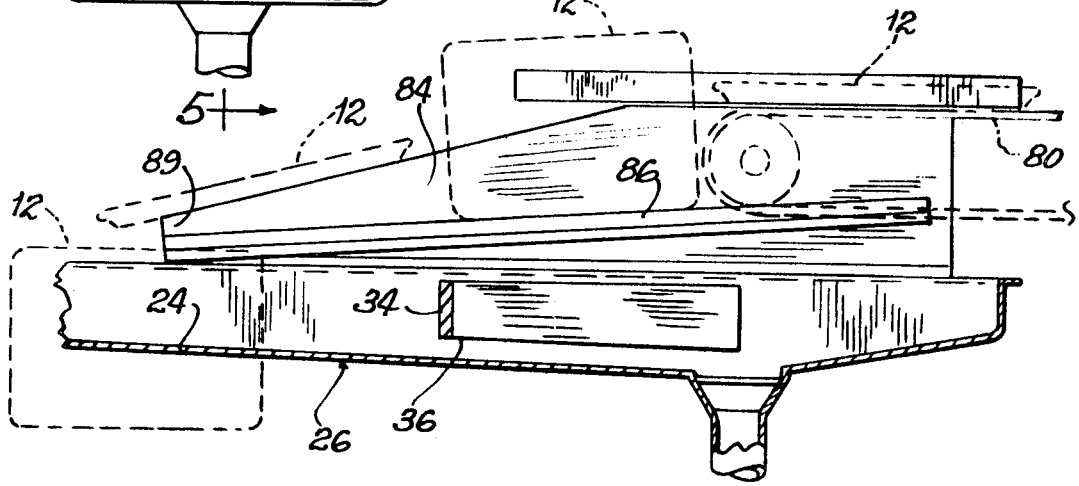

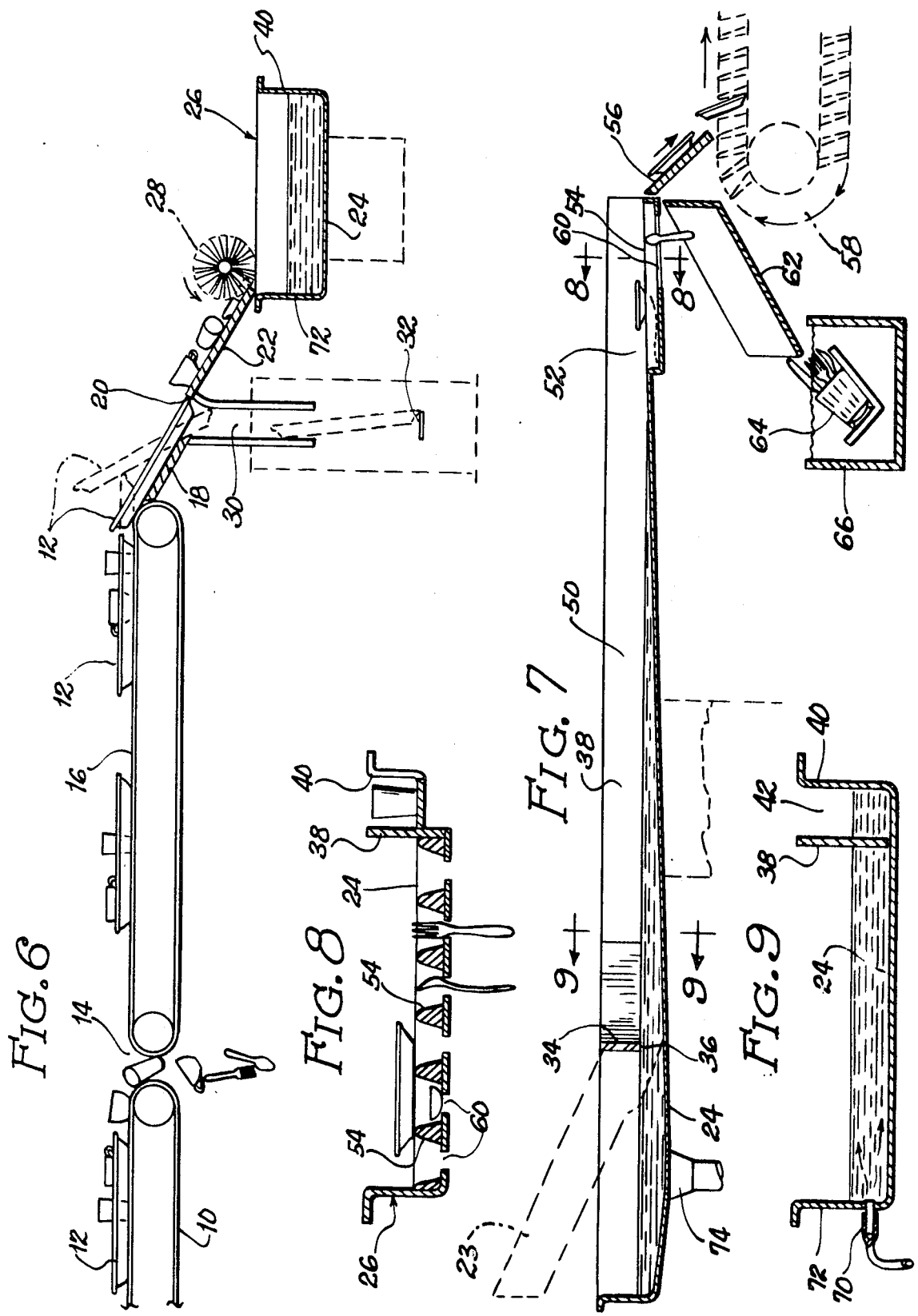

3,605,767
VIBRATING SORTER FOR SOILED TABLEWARE
Ralph Ettlinger, Jr., Highland Park, and Walter M. Schneider, Chicago, Ill., assignors to Avant Industries, Inc., Wheeling, Ill.
Filed May 28, 1969, Ser. No. 828,510
Int. Cl. B08b 3/04
U.S. Cl. 134—62    15 Claims

ABSTRACT OF THE DISCLOSURE

A construction for handling soiled tableware so that the tableware can be automatically sorted prior to placement into holders used for supporting the tableware as it passes through a dishwashing machine. A vibrating conveyor is provided for receiving the tableware, and a barrier extends across the conveyor bed to separate flatware comprising plates and silverware from pieces of greater height such as cups and glasses. The separated tableware is delivered along separate paths to the end of the vibrating bed for placement in appropriate racks or other dishwashing equipment holding means. The flatware is divided by providing slots in a corrugated section of the bed so that the silverware is collected apart from plates. Means are also provided for separating soiled dishes from cafeteria trays where the dishes are initially delivered on such trays.

This invention relates to a construction for the handling of soiled tableware prior to placement of the tableware in dishwashing equipment.

It is well-known that many institutions, for example, schools and restaurants, handle large volumes of tableware in providing food service. A typical arrangement involves cafeteria style service wherein persons place tableware including plates, saucers, cups, glasses and silverware on a cafeteria tray. When the meal is finished, these must be collected in some fashion and prepared for washing.

It is normal practice to separate and then stack or otherwise collect the various types of tableware. For example, employees will form separate stacks of cafeteria trays, plates, saucers, cups, etc., and the same or other personnel will load the stacked pieces onto racks used in automatic dishwashing equipment or directly onto conveyors provided in the equipment. This, of course, involves a separate unstacking operation for articles such as plates, bowls, dishes and saucers.

It is a general object of this invention to provide a system for the handling of soiled tableware, whereby the tableware can be conveyed in random fashion to the separating equipment and thereafter automatically separated so that the only handling involved is the loading of cups and glasses into washing racks and placing said racks and silverware, which has been automatically placed in washing cylinders, into the dishwashing machine.

It is a specific object of this invention to provide a system for handling soiled tableware which is particularly useful in connection with cafeteria operations whereby soiled tableware can first be automatically separated from cafeteria trays, and whereby the tableware is then sorted by the equipment to greatly improve the efficiency of loading into automatic dishwashing equipment.

It is a still further object of this invention to provide an arrangement uniquely suitable for the handling of soiled silverware whereby the silverware can be automatically delivered to baskets for immediate transfer of the brackets to dishwashing equipment without other handling requirements.

These and other objects of this invention will appear hereinafter, and for purposes of illustration, but not of limitation, specific embodiments of the invention are shown in the accompanying drawings in which:

FIG. 1 is a plan view of a tableware handling system characterized by the features of this invention;

FIG. 2 is a plan view of an alternative arrangement providing an in-line structure for delivery of tableware to a vibrating conveyor;

FIG. 3 is an enlarged fragmentary plan view illustrating an alternative arrangement for the separation of tableware from cafeteria trays;

FIG. 4 is a cross-sectional view of the arrangement shown in FIG. 3;

FIG. 5 is a sectional view, taken about the line 5—5 of FIG. 4;

FIG. 6 is an enlarged, fragmentary, side elevation illustrating the tray and tableware separation means of FIG. 1;

FIG. 7 is a cross-sectional view of the vibrating bed illustrated in FIG. 1;

FIG. 8 is a sectional view, taken about the line 8—8 of FIG. 7;

FIG. 9 is a sectional view taken about the line 9—9 of FIG. 7;

Figure 10:
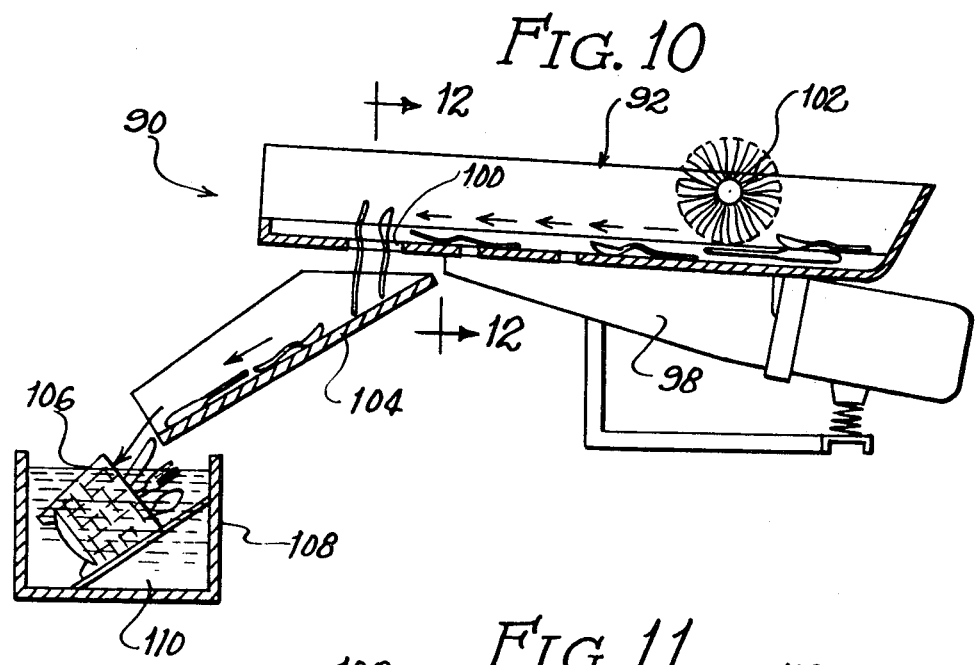
FIG. 10 is a cross-sectional view of a silverware handling unit characterized by the features of this invention.

The construction of this invention generally comprises a vibrating conveyor defining a bed for receiving tableware. The tableware is deposited on the bed in random fashion and is then separated into flatware such as plates and silverware and into pieces of greater height such as cups and glasses. This separation is accomplished by barrier means which are located in spaced relationship relative to the conveyor bed to permit passage of the flatware while directing cups and glasses along a separate path on the bed.

At the end of the conveyor bed, the flatware is separated by providing means permitting passage of silverware through the bed while plates and other flatware are deposited at the end of the conveyor. Dishwashing racks which can be loaded into dishwashing equipment or which are provided by the equipment itself are preferably situated at the end of the vibrating conveyor so that the separated pieces can be immediately placed in a dishwasher.

Where the construction is employed in a careteria operation, means are provided for separating tableware from cafeteria trays. This is accomplished automatically by dumping the trays in a manner such that all tableware is removed and deposited on the vibrating conveyor bed while the trays are directed to a separate washing station.

The construction illustrated in FIG. 1 comprises one form of the instant invention. This construction is particularly suitable for cafeteria-type arrangements, and a first conveyor 10 is employed for delivering trays 12 from the dining area to the dishwashing area. As will be explained, the system to be described initially provides for separation of soiled tableware from the trays. Accordingly, a gap 14 is provided between the conveyor 10 and a separate conveyor 16 so that any single items of tableware will drop through the gap whereby only trays will move onto the conveyor 16.

A light trash removal station 15 is located beyond the gap 16. This removal may be effected by air blasts which will dislodge napkins, milk cartons, etc. The next station 17 is provided for removal of trays which are stacked together. These trays may be manually or automatically removed at this point if the tray dumping means will not handle two or more trays stacked together.

At the end of the conveyor 16, there is provided a first downwardly inclined stationary board 18 (also see FIG. 6). The trays 12 are moved onto the board 18, and the leading edge of each tray then engages the end wall 20 of a second downwardly inclined board 22. The momentum of the tableware causes the tableware on the trays to be discharged onto the surface of the board 22. This tableware slides down the board under the influence of gravity and is eventually deposited on the bed 24 of vibrating conveyor 26. A brush 28 extends across the end of the board 22 to retard the movement of the tableware, particularly if relatively fragile dishes are being handled.

When a tray is located on the surface of the board 18 in the solid line position shown in FIG. 6, the next tray will engage the end of the inclined tray and tilt the tray as shown in dotted lines. A downwardly extending channel 30 is provided for delivering the empty trays to a separate conveyor 32. The trays can then be separately directed past tray washer sprays as shown at 33 and tray dryer and stacker stations.

The soiled tableware deposited on the vibrating conveyor bed 24 is moved from left to right along the conveyor bed. To provide initial sorting of the tableware, a barrier 34 extends across a portion of the conveyor bed. This barrier defines a bottom edge 36 which is spaced from the bed 24 by a sufficient distance to permit the passage of flatware, including plates and silverware. Articles of greater height such as cups and glasses are restrained by the barrier, and are diverted along a separate path. This path is defined by an interior wall 38 running parallel to one side wall 40 of the vibrating conveyor.

As shown in dotted lines in FIG. 7, the bed 24 may include an inclined end 23 to insure movement of the tableware along the initial portion of the conveyor. Water streams may be applied in this area as a prewash. A separating barrier such as the barrier 34 may be located in this area since the velocity of the tableware will enhance separation.

At the end of the path 42 defined by the walls 38 and 40, there is provided an unloading station including means for holding cup racks 44 and glassware racks 46. The tableware can be manually removed from the conveyor bed at this point and placed directly in the racks, and the racks can then be placed in a dishwasher 48 located at the end of the vibrating conveyor.

The main portion 50 of the conveyor bed terminates in a silverware separation section 52. This section includes a plurality of ridges 54 having their top edges in the same plane as the conveyor bed 24. The depressions defined between the ridges are adapted to receive silverware as it moves to the end of the conveyor bed. Plates and other flatware will, however, move over the top of the ridges and are finally deposited on the inclined end member 56 where they are collected by the moving bed 58 of the dishwasher.

The silverware passes through slots 60 defined between the ridges 54. A chute 62 directs the silverware into individual baskets 64 which are held in an inclined position for automatic filling. A trough 66 may be filled with water or other liquid for pre-soaking of the silverware; however, in any case, the baskets 64 can then be manually loaded in a dishwashing machine.

Nozzles 70 are provided in the opposite side wall 72 of the vibrating conveyor for introducing water. A sump 74 is provided adjacent the entry end of the conveyor whereby the water is moved in a direction opposite the movement of the soiled tableware. This arrangement is a means for removing some food particles and other garbage, particularly any pieces that float. A suitable garbage skimmer may be utilized to remove such pieces from the surface of the water to avoid the necessity for separating these pieces from the tableware at the end of the conveyor.

FIG. 2 illustrates an arrangement employing the same vibrating conveyor construction as that shown in FIG. 1. In this instance, however, an "in-line" system is provided for delivering the soiled tableware to the vibrating conveyor 26. This system includes a separate conveyor 16', a first downwardly directed support 18', a tray drop chute 30', a second downwardly directed support 22', and retarder brush 28'. The system operates in the same manner as the system described in FIGS. 1 and 6.

FIGS. 3, 4 and 5 illustrate a further alternative for separating cafeteria trays from soiled tableware and for transferring the tableware to a vibrating conveyor 26. In this instance, a separate belt conveyor 80 moves the loaded trays into contact with a deflector bar 82 which extends at an angle across the end of the belt. This deflector forces the loaded trays sideways onto an inclined platform 84. A ledge 86 is formed adjacent the bottom edge of the platform so that the trays are restrained against movement onto the conveyor 26. The soiled dishes will tumble onto the conveyor when the trays are in this inclined position. A retarder brush 88 is employed where there is a need to protect the tableware against damage. The platform 84 gradually tapers toward narrow end 89, and this causes the trays to fall back to an original position when the inside edges of the trays move past the deflector 82. The trays can then be passed by means of a separate conveyor to appropriate cleaning and drying apparatus.

Figure 11:
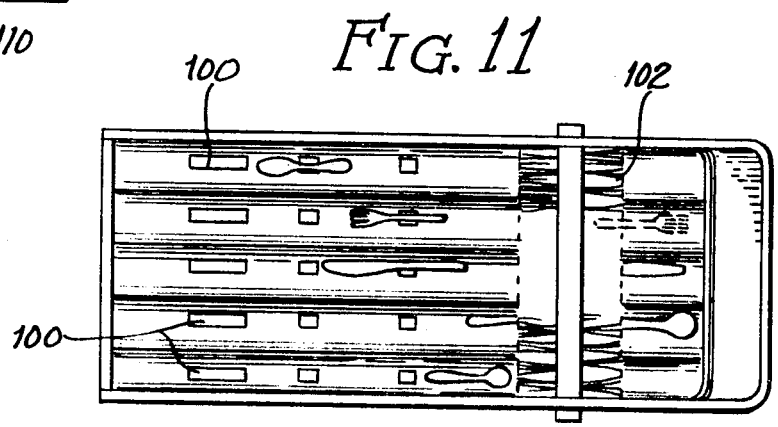
FIG. 11 is a plan view illustrating the vibrating conveyor section of FIG. 10; and, FIG. 12 is a cross-sectional view, taken about the line 12—12 of FIG. 10.
Figure 12:
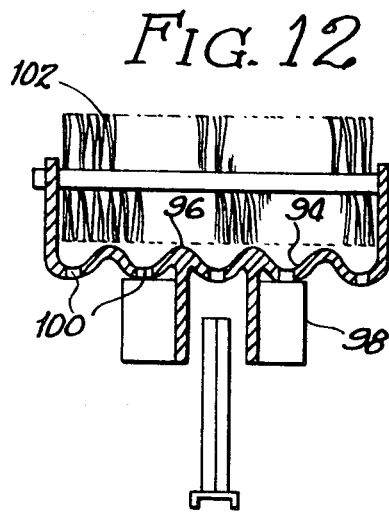

FIGS. 10, 11 and 12 illustrate a silverware handling mechanism 90 which incorporates features similar to those utilized in the end section of the vibrating conveyor 26. Thus, the trough 92 is provided with a bed formed of depressions 94 and ridges 96. This combination is provided by corrugating the bottom wall of the trough; however, ridges can be built-in, for example, as shown in FIG. 8. The trough is supported on a standard vibrator 98, and the vibrating mechanism is such that the silverware will move from right to left over the bed.

When silverware is loaded in the right-hand end of the construction, the vibrating action will move the silverware toward the discharge end which is provided with slots 100. A rotating brush 102 may be located adjacent the loading end to assist in maintaining the silverware in the depressions 94. Thus, use of a brush, fingers, or similar means will reduce the possibility of silverware piling up if an excessive load is placed in the construction.

The silverware is adapted to be discharged through the slots 100 through a chute 104 and then into collecting basket 106. This basket is located in a trough 108 which may be filled with water 110 to provide a pre-soak, and the basket is suitable for loading in automatic dishwashing equipment.

Particularly where soiled silverware is being handled, the working ends of the silverware should be exposed at the top of the basket 106 with the handles at the bottom. This provides for more effective cleaning in automatic dishwashing equipment. To accomplish this, the slots 100 are dimensioned so that only the handles of the silverware can pass through the slots when the silverware lies flat in the depressions 94. Considering, for example, the spoon shown at the top of FIG. 11, the vibrating action will move the working end of the spoon across the slot 100; however, the handle of the spoon will fall through when it becomes free of contact with the bottom of the depression. Since the working end of the spoon is wider than the slot in one position, it may hang temporarily as shown in FIG. 10; however, the vibrating action will soon turn the spoon sufficiently to cause it to drop onto the chute 104. With this arrangement, the working ends of the silverware will enter the basket in the upright position.

It will be appreciated that the same arrangement for controlling the position of the silverware is preferred for the section 52 of the conveyor 26. In a typical operation, the conveyor 10, 16 may deliver 1000 18-inch cafeteria trays per hour to the sorting construction. As noted, light garbage may be removed by blow-off means; however, suction devices could also be employed for this purpose.

The presence of water in the vibrating conveyor trough will function to cushion the impact of tableware on the conveyor bed. In addition to the pre-washing function already referred to, the water will also serve to reduce noise. Finally, suitable openings may be provided whereby the water can be induced or forced out along with additional pieces of garbage. A garbage skimmer, for example, in the form of an arm sweeping over the water surface (FIG. 1) may be provided to remove any floating pieces. Any garbage which is not automatically removed by the means described can be manually separated adjacent the discharge end of the construction. The amount of such garbage is extremely small compared with conventional operations.

It will be understood that various changes and modifications may be made in the construction described which provide the characteristics of this invention without departing from the spirit thereof particularly as defined in the following claims.

That which is claimed is:

1. A construction for handling soiled tableware to provide for sorting of different types of tableware and for delivery of the sorted tableware to dishwashing equipment, said construction comprising a vibrating conveyor having a loading end and defining a bed for receiving the tableware, at least one sorting member extending across the bed for engaging a portion of the tableware and for directing this portion along a specific path defined by the bed, said bed defining an upwardly inclined tableware supporting surface and side walls at least at said loading end to provide a well, water delivery and circulating means associated with the construction at said loading end to provide a flow of water over said bed and to maintain water in said well for contact with the tableware loaded on the bed, and means adjacent the discharge end of the conveyor for receiving different types of tableware sorted by the construction.

2. A construction in accordance with claim 1 wherein said sorting member comprises a barrier extending across said bed, said barrier defining a lower edge located in spaced relationship with said bed to permit a portion of the tableware to move beneath the barrier, and wherein a separate portion of the tableware engages the barrier to restrain movement along the bed.

3. A construction in accordance with claim 2 wherein said barrier extends at an angle across the bed, and wherein the portion of tableware restrained by the barrier is directed along a line defined by the barrier to a side portion of the bed, and including a wall separating said side portion from the main bed portion to keep the tableware portions separated from each other.

4. A construction in accordance with claim 1, including a separate conveyor for delivering tableware to said vibrating conveyor, and a tray separation means located between said conveyors for separating tableware from cafeteria-type trays so that the trays are not moved onto the vibrating conveyor.

5. A construction in accordance with claim 1 wherein the tableware on said vibrating conveyor is separated into two portions, one of said portions comprising flatware such as dishes and saucers, and silverware, and including means for separating the flatware from the silverware adjacent the end of the vibrating conveyor.

6. A construction in accordance with claim 5, wherein said vibrating conveyor includes a slotted end portion, and upstanding ribs extending longitudinally along the bed in said end portion, said flatware being adapted to move over the bed in contact with said ribs while said silverware falls into the gaps defined between the ribs and then through said slots for collection in containers for holding the silverware in the dishwashing equipment.

7. A construction for handling soiled tableware loaded on trays to provide for sorting of different types of tableware and for delivery of the sorted tableware to dishwashing equipment, said construction comprising a vibrating conveyor defining a bed for receiving the tableware, a separate conveyor for carrying said trays and for thereby delivering tableware to the vicinity of said vibrating conveyor, and a tray separation means located between said conveyors for separating tableware from the trays so that the trays are not moved onto the vibrating conveyor, said tray separating means comprising a first downwardly inclined surface at the discharge end of said separate conveyor, an opening for receiving the trays defined at the end of said first downwardly inclined surface, a second downwardly inclined surface on the opposite side of said opening, said second surface being located in a plane above said first surface, and abutment means located adjacent the front edge of said second surface for engaging the leading edge of a tray located on said first surface, and wherein said abutment means holds the tray so that the trailing edge of the tray will be engaged by the following tray on said separate conveyor whereby the following tray operates to tilt the tray on said first surface upwardly for movement of the trays through said opening between the first and second surfaces, and wherein tableware located on a tray is transferred by momentum onto said second surface when the leading edge of a tray engages said abutment means, at least one sorting member extending across the vibrating conveyor bed for engaging a portion of the tableware and for directing this portion along a specific path defined by the bed, water delivery and circulating means associated with the construction to provide a flow of water over said bed for contact with the tableware, and means adjacent the discharge end of the conveyor for receiving different types of tableware.

8. A construction in accordance with claim 7, including retarding means adjacent the end of said second surface to reduce the impact of said tableware as it moves from said second surface as it moves from said vibrating conveyor.

9. A construction for handling soiled tableware loaded on trays to provide for sorting of different types of tableware and for delivery of the sorted tableware to dishwashing equipment, said construction comprising a vibrating conveyor defining a bed for receiving the tableware, a separate conveyor for carrying said trays and for thereby delivering tableware to the vicinity of said vibrating conveyor, and a tray separation means located between said conveyors for separating tableware from the trays so that the trays are not moved onto the vibrating conveyor, and including light trash removal means associated with said separate conveyor for removing such trash prior to separation of the tableware from the trays, at least one sorting member extending across the vibrating conveyor bed for engaging a portion of the tableware and for directing this portion along a specific path defined by the bed, water delivery and circulating means associated with the construction to provide a flow of water over said bed for contact with the tableware, and means adjacent the discharge end of the conveyor for receiving different types of tableware.

10. A construction in accordance with claim 9, wherein said removal means comprises a blower adapted to direct an air stream into contact with loaded trays.

11. A construction for handling soiled tableware loaded on trays to provide for sorting of different types of tableware and for delivery of the sorted tableware to dishwashing equipment, said construction comprising a vibrating conveyor defining a bed for receiving the tableware, a separate conveyor for carrying said trays and for thereby delivering tableware to the vicinity of said vibrating conveyor, and a tray separation means located between said conveyors for separating tableware from the trays so that the trays are not moved onto the vibrating conveyor, and including a gap in said separate conveyor prior to the point of separation of tableware from trays, and wherein tableware items not on a tray fall through the gap and are not carried to the point of separation of the tableware and trays, at least one sorting member extending across the vibrating conveyor bed for engaging a portion of the tableware and for directing this portion along a specific path defined by the bed, water delivery and circulating means associated with the construction to provide a flow of water over said bed for contact with the tableware, and means adjacent the discharge end of the conveyor for receiving different types of tableware.

12. In a construction for handling soiled tableware to provide for sorting of different types of tableware including silverware and flatware and for delivery of the sorted tableware to dishwashing equipment, the improvement wherein said construction comprises a vibrating conveyor defining a bed for receiving the tableware, water delivery and circulating means associated with the construction to provide a flow of water over said bed for contact with the tableware, and means for separating the silverware from other tableware on the bed, the separating means comprising a ribbed portion defined by said bed, the ribs extending longitudinally along the bed, slots defined between the ribs dimensioned to permit the passage of silverware therethrough, said flatware being adapted to move over the bed in contact with said ribs while said silverware falls between the ribs and then through said slots for collection independently of the other tableware, and means adjacent the discharge end of the bed for collecting the other tableware.

13. A construction for handling soiled tableware loaded on trays to provide for sorting of different types of tableware and for delivery of the sorted tableware to dishwashing equipment, said construction comprising a vibrating conveyor defining a bed for receiving the tableware, a separate conveyor for carrying said trays and for thereby delivering tableware to the vicinity of said vibrating conveyor, and a tray separation means located between said conveyors for separating tableware from the trays so that the trays are not moved onto the vibrating conveyor, and wherein said tray separating means comprises a downwardly inclined surface extending from a point adjacent a side edge of said separate conveyor downwardly to a point adjacent the vibrating conveyor, a deflector extending at an angle over the top surface of said separate conveyor for moving trays onto said inclined surface, abutment means extending upwardly from said inclined surface for engaging an edge of each tray to prevent movement of the trays onto said vibrating conveyor, and wherein said tableware is discharged from the trays while they are held in an inclined position on said inclined surface, at least one sorting member extending across the vibrating conveyor bed for engaging a portion of the tableware and for directing this portion along a specific path defined by the bed, water delivery and circulating means associated with the construction to provide a flow of water over said bed for contact with the tableware, and means adjacent the discharge end of the conveyor for receiving different types of tableware.

14. A construction in accordance with claim 13, wherein said inclined surface is attached to said vibrating conveyor whereby said trays are moved along the inclined surface for discharge of the trays at the end of the inclined surface.

15. A construction for handling silverware comprising a vibrating bed, a plurality of ridges situated in spaced apart relationship across said bed, a plurality of depressions formed between said ridges, slots defined at the bottom of said depressions, said slots being dimensioned to permit the passage of silverware therethrough, means positioned beneath said bed for receiving the silverware and for delivering the silverware to holding means, means for applying water to the silverware on the bed, and additional openings defined by the bed for draining the water.

References Cited
UNITED STATES PATENTS

| | | | |
|---|---|---|---|
| 3,042,200 | 7/1962 | Nowak | 209—99 |
| 3,486,939 | 12/1969 | Pinckard | 134—62 |

RICHARD A. SCHACHER, Primary Examiner

U.S. Cl. X.R.

209—75, 90, 97